Nov. 14, 1933.   C. H. HAPGOOD   1,935,184
MILKING MACHINE TEAT CUP
Filed March 19, 1932
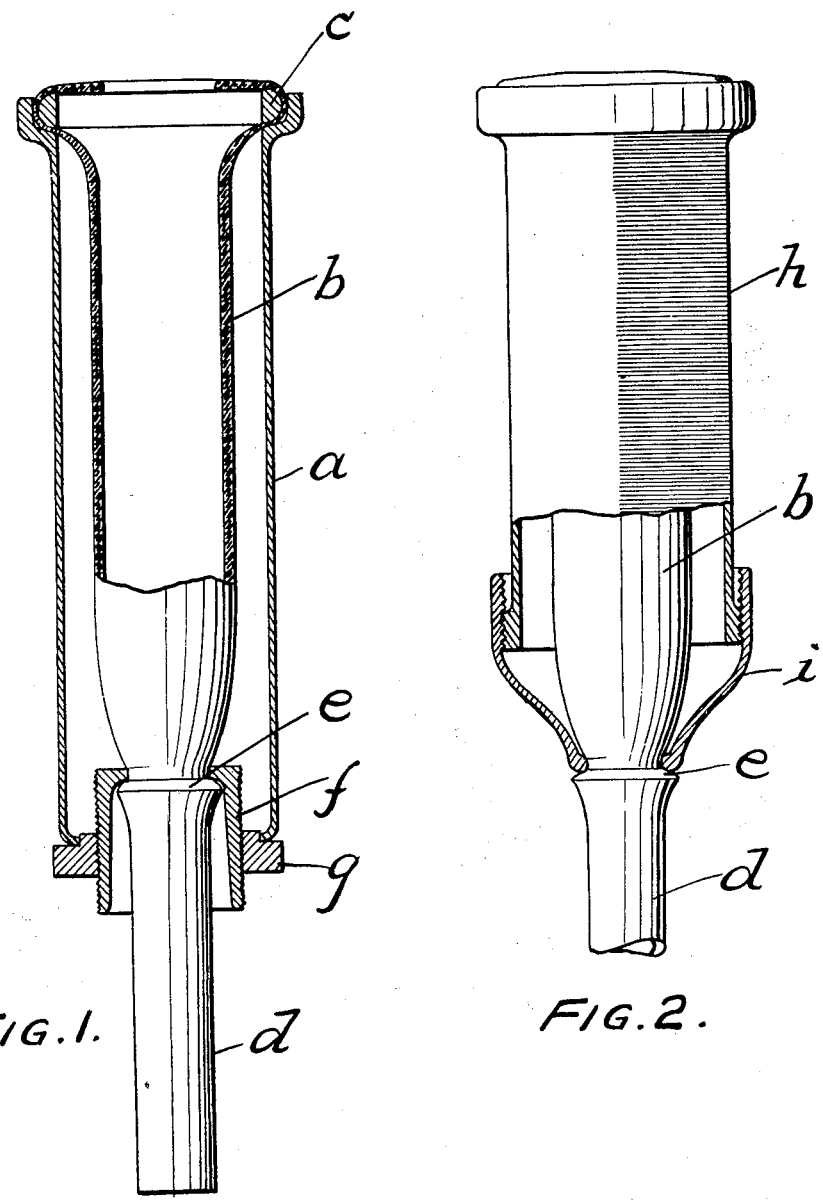
WITNESS:
Rob R Kitchel.
INVENTOR
Cyrus Howard Hapgood
BY
Busser and Harding
ATTORNEYS.

UNITED STATES PATENT OFFICE 1,935,184

MILKING MACHINE TEAT CUP

Cyrus Howard Hapgood, Nutley, N. J., assignor to The De Laval Separator Company, New York, N. Y., a corporation of New Jersey Application March 19, 1932. Serial No. 599,874

3 Claims. (Cl. 31—85)

It is a well known characteristic of a rubber teat cup liner that, due to the pneumatic pulsations to which it is subjected and to the tendency of rubber to more or less deteriorate with diminution of its elasticity, the liner becomes more or less stretched after it has been in use for a comparatively short time, necessitating partial disassemblage of the teat cup and readjustment of the liner. The object of the present invention is to provide means whereby, without disassemblage of the teat cup, the liner may be, at any time, speedily and accurately placed under proper tension to compensate for the elongation above mentioned. The tension-adjusting device is intended, also, to be used in the initial adjustment of the tension upon the liner before delivering it to the user.

In the drawing, Figs. 1 and 2 are longitudinal sectional views of two of the different possible embodiments of the invention.

The teat cup shown in Fig. 1 comprises an outer metal shell, the main body $a$ of which is expanded at its upper end, and an inner rubber liner $b$ which is stretched and expanded at its upper end and there held within the expanded upper end of the shell $a$ by means of an internal ring $c$. The liner $b$ is shown as integral with a tube or hose $d$, which communicates with a milk receiver that is under a partial vacuum. At the junction of the liner $b$ and milk tube $d$ is formed an upwardly facing shoulder $e$ which is engaged by an inwardly extending annular flange on a collar $f$. On the collar $f$ is threaded a screw nipple $g$, provided with an outwardly and upwardly facing shoulder abutting against the bent in lower extremity of the shell $a$.

By adjusting the screw nipple $g$, the tension on the liner $b$ may be initially adjusted. As the liner stretches in use, the screw nipple is turned in a direction to move the collar $f$ downward, thereby taking up the stretch.

In Fig. 2, the body of the shell $h$ has threaded on its lower end an end closure $i$ the contracted lower extremity of which engages the shoulder $e$ at the junction of the liner $b$ and milk tube $d$. By turning the end piece $r$ of the shell, the proper tension may be imposed on the liner.

I claim:

1. A double chambered teat cup comprising an outer shell, a milk conduit comprising a flexible and elastic liner and a milk tube provided with an upwardly facing shoulder, a collar surrounding the milk conduit and whose upper end engages the same above said shoulder, and a screw nipple abutting against the shell and threaded on the collar and turnable to move the collar in the direction of the longitudinal extension of the liner.

2. A double chambered teat cup comprising an outer shell, a milk conduit comprising a flexible and elastic liner and a milk tube provided with an upwardly facing shoulder, and an end shell closure threaded on the shell and having a contracted lower end surrounding the milk conduit and engaging the same above said shoulder.

3. A double chambered teat cup comprising a milk conduit forming a vacuum chamber and consisting of a flexible and elastic liner and a milk tube, there being an outwardly extending and upwardly facing shoulder on the milk conduit at the junction of the liner and milk tube, and means forming an annular pulsation chamber surrounding the liner, said means comprising a unitary shell which forms the major part of the pulsation chamber wall and a bottom closure which forms the remaining part of the pulsation chamber wall, said closure comprising a member which extends above and engages the shoulder and which is adjustable, by hand manipulation, relative to the shell, in the direction of the longitudinal extension of the shell and liner, without disassemblage of the teat cup, to regulate the pulling tension on the liner.

CYRUS HOWARD HAPGOOD.